United States Patent
Payne et al.

(10) Patent No.: US 10,679,456 B2
(45) Date of Patent: *Jun. 9, 2020

(54) FUEL DISPENSER HAVING INTEGRATED CONTROL ELECTRONICS

(71) Applicant: Gilbarco Inc., Greensboro, NC (US)

(72) Inventors: Edward Asbell Payne, Kernersville, NC (US); Rodger K. Williams, Siler City, NC (US)

(73) Assignee: Gilbarco, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,284

(22) Filed: Mar. 27, 2017

(65) Prior Publication Data

US 2017/0278338 A1 Sep. 28, 2017

Related U.S. Application Data

(60) Provisional application No. 62/313,781, filed on Mar. 27, 2016.

(51) Int. Cl.
*G07F 15/00* (2006.01)
*G07F 9/00* (2006.01)
(Continued)

(52) U.S. Cl.
CPC ............ *G07F 15/001* (2013.01); *B67D 7/04* (2013.01); *B67D 7/10* (2013.01); *B67D 7/14* (2013.01);
(Continued)

(58) Field of Classification Search
CPC ........ G07F 15/001; G07F 9/006; G07F 7/025; G07F 13/02; G07F 13/025; G07F 9/023;
(Continued)

(56) References Cited

U.S. PATENT DOCUMENTS 4,967,366 A 10/1990 Kaehler
5,040,577 A 8/1991 Pope
(Continued)

FOREIGN PATENT DOCUMENTS

CN 1767502 A 5/2006
CN 103116515 A 5/2013

OTHER PUBLICATIONS

"Multi-Core CPUs Help Embedded Systems Reduce Interrupt Latency, and Increase Software Reliability". Paul Fischer. Retrieved from https://web.archive.org/web/20080315224640/http://www.embeddedintel.com:80/technology_applications.php?app=288 on Sep. 14, 2018.*

(Continued)

*Primary Examiner* — Nathan A Mitchell
(74) *Attorney, Agent, or Firm* — Nelson Mullins Riley & Scarborough, LLP (57) ABSTRACT

A fuel dispenser comprises fuel flow piping defining a flow path from a source of fuel toward a fueling nozzle. A plurality of fuel handling components are disposed along the fuel flow piping. Control electronics, in operative communication with the fluid handling components, include a multi-core processor having at least two processor cores located on a common integrated circuit chip, the at least two processor cores utilizing different operating systems in an asynchronous manner.

12 Claims, 7 Drawing Sheets

(51) Int. Cl.

| | | |
|---|---|---|
| *G07F 9/02* | (2006.01) | |
| *G07F 13/02* | (2006.01) | |
| *B67D 7/04* | (2010.01) | |
| *B67D 7/14* | (2010.01) | |
| *B67D 7/16* | (2010.01) | |
| *G05D 7/06* | (2006.01) | |
| *G06Q 20/14* | (2012.01) | |
| *G06Q 20/20* | (2012.01) | |
| *G06Q 30/02* | (2012.01) | |
| *G07F 7/02* | (2006.01) | |
| *B67D 7/10* | (2010.01) | |
| *G06Q 20/34* | (2012.01) | |
| *G06Q 20/38* | (2012.01) | |
| *G06Q 50/06* | (2012.01) | |
| *G06Q 50/30* | (2012.01) | |
| *G06F 3/048* | (2013.01) | |

(52) U.S. Cl.
CPC ............ *B67D 7/16* (2013.01); *G05D 7/0676* (2013.01); *G06Q 20/145* (2013.01); *G06Q 20/204* (2013.01); *G06Q 20/34* (2013.01); *G06Q 20/382* (2013.01); *G06Q 30/0241* (2013.01); *G06Q 30/0268* (2013.01); *G06Q 50/06* (2013.01); *G06Q 50/30* (2013.01); *G07F 7/025* (2013.01); *G07F 9/006* (2013.01); *G07F 9/023* (2013.01); *G07F 13/02* (2013.01); *G07F 13/025* (2013.01); *G06F 3/048* (2013.01)

(58) Field of Classification Search
CPC ...... G06Q 20/34; G06Q 20/145; G06Q 50/30; G06Q 50/06; G06Q 30/0241; G06Q 30/0268; G06Q 20/204; G06Q 20/382; B67D 7/14; B67D 7/16; B67D 7/10; B67D 7/04; G06F 3/048
See application file for complete search history.

(56) References Cited

U.S. PATENT DOCUMENTS

| | | | |
|---|---|---|---|
| 5,689,071 A | | 11/1997 | Ruffner et al. |
| 5,734,851 A | | 3/1998 | Leatherman et al. |
| 5,954,080 A | | 9/1999 | Leatherman |
| 5,956,259 A | | 9/1999 | Hartsell et al. |
| 6,052,629 A | | 4/2000 | Leatherman et al. |
| 6,435,204 B2 | | 8/2002 | White et al. |
| 6,935,191 B2 | | 8/2005 | Olivier et al. |
| 7,107,231 B1 | | 9/2006 | Hall et al. |
| 7,289,877 B2 | | 10/2007 | Wilson |
| 8,200,878 B2 | | 6/2012 | Ishimi |
| 8,438,064 B2 | | 5/2013 | Berrio et al. |
| 8,928,897 B2 | | 1/2015 | Silverbrook |
| 8,960,019 B1 | * | 2/2015 | Oldham ................... G06F 1/14 137/234.6 |
| 9,972,159 B2 | | 5/2018 | Carapelli et al. |
| 2008/0288664 A1 | * | 11/2008 | Pettey ................. H04L 12/4633 710/5 |
| 2008/0295568 A1 | * | 12/2008 | Nanaji ................... B67D 7/085 73/1.34 |
| 2009/0048710 A1 | | 2/2009 | Deline |
| 2009/0119221 A1 | * | 5/2009 | Weston ................ G06Q 20/382 705/76 |
| 2009/0265638 A1 | | 10/2009 | Carapelli et al. |
| 2010/0153649 A1 | | 6/2010 | Li et al. |
| 2011/0134044 A1 | * | 6/2011 | Carapelli .................. G07F 9/02 345/168 |
| 2011/0185319 A1 | | 7/2011 | Carapelli |
| 2011/0271277 A1 | * | 11/2011 | Hussain ................ G06F 9/5077 718/1 |
| 2012/0059694 A1 | * | 3/2012 | Kuebert ............... G06Q 20/206 705/14.4 |
| 2013/0103190 A1 | * | 4/2013 | Carapelli ................ G06F 21/82 700/237 |
| 2013/0176687 A1 | * | 7/2013 | Epperson ............. H05K 7/1478 361/735 |
| 2014/0089174 A1 | | 3/2014 | Carapelli et al. |
| 2014/0157284 A1 | | 6/2014 | Sambasivan et al. |
| 2015/0088982 A1 | | 3/2015 | Johnson et al. |
| 2015/0105920 A1 | | 4/2015 | Carapelli et al. |
| 2015/0286589 A1 | * | 10/2015 | Zante .................... G06F 13/124 710/305 |
| 2015/0301983 A1 | | 10/2015 | Vorbach et al. |
| 2017/0178257 A1 | * | 6/2017 | Tingler .............. G06K 7/10297 |
| 2017/0203436 A1 | * | 7/2017 | Wei ......................... B25J 9/161 |
| 2017/0344407 A1 | | 11/2017 | Jeon et al. |

OTHER PUBLICATIONS

International Search Report and Written Opinion dated Jun. 5, 2017 in corresponding international application serial No. PCT/US2017/024304, all enclosed pages cited.
Co-pending U.S. Appl. No. 15/470,299, filed Mar. 27, 2017, all enclosed pages cited.
Non-final office action dated Aug. 19, 2019 in co-pending U.S. Appl. No. 15/470,299, all enclosed pages cited.
Extended European Search Report dated Dec. 13, 2019 in corresponding European patent application serial No. 17776390.1, all enclosed pages cited.
Paul Fischer: "Embedded Intel Solutions: Multi-Core CPUs Help Embedded Systems Reduce Interrupt Latency, and Increase Software Reliability," Mar. 15, 2008, XP55650443, retrieved Dec. 6, 2019, URL:https://web.archive.org/web/20050315224640/http://www.embeddedintel.com:80/technology_applications.php?app=288, all enclosed pages cited.
NXP "i.MX 6Dual, i.MX 6DualPlus, i.MX 6Quad, i.MX 6QuadPlus Applications Processors" spec sheet, retrieved from www.nxp.com/iMX6series, copyright 2015-2016, all enclosed pages cited.
First Office Action dated Mar. 3, 2020 in corresponding Chinese patent application serial No. 201780027859.3, all enclosed pages cited.

* cited by examiner

FUEL DISPENSER HAVING INTEGRATED CONTROL ELECTRONICS

PRIORITY CLAIM

This application is based upon and claims priority to provisional application Ser. No. 62/313,781, filed Mar. 27, 2016, which is incorporated herein by reference in its entirety for all purposes.

FIELD OF THE INVENTION

The present invention relates generally to service stations at which fuel is dispensed. More particularly, the present invention relates to a fuel dispenser having integrated control electronics.

BACKGROUND

Retail fueling environments usually include a plurality of fuel dispensers located in a forecourt area outside of a convenience store building. Typically, the fuel dispensers will each be equipped with pay-at-the-pump capability by which the customer can perform the fueling transaction using a user interface on the respective fuel dispenser. For example, the customer can present a credit or debit card using a card reader installed on the fuel dispenser's user interface to pay for the fuel without entering the store. Internally, the dispensers typically contain flow meters, pulsers, control electronics, valves, manifolds, and internal piping. Many of these components are subject to regulatory requirements to maintain a high degree of accuracy.

Various additional systems may also be provided in the fuel dispensing environment, some external and some internal to the fuel dispenser. For example, the convenience store will generally be equipped with a point-of-sale (POS) system to handle certain functions relating to transactions that occur in the retail fueling environment. Transactions are recorded using the POS for inventory reconciliation and other recordkeeping purposes. In addition, the POS may allow the station's manager the ability to set options associated with the POS or the service station, such as the appearance of receipts issued by the stations' dispensers.

Traditionally, the POS was also configured to handle payment processing and included forecourt control functionality. More recently, some fueling environments have been deployed in which payment processing and forecourt control is handled by a separate device, which may be referred to as "enhanced dispenser hub." Such a device is shown and described in U.S. Pat. No. 8,438,064, incorporated herein by reference in its entirety for all purposes. In addition, there is a desire to provide video and audio at the fuel dispenser for advertising or entertainment purposes. In this regard, a separate media source may interact with the fuel dispenser's display(s), as described in U.S. Pub. No. 20090265638, incorporated herein by reference in its entirety for all purposes. Generally speaking, separate computers are provided to handle the disparate functions of dispenser control, forecourt systems, media, automation, and connectivity.

SUMMARY OF CERTAIN ASPECTS

The present invention recognizes and addresses the foregoing considerations, and others, of prior art construction and methods. In this regard, certain exemplary and nonlimiting aspects of the present invention will now be described. These aspects are intended to provide some context for certain principles associated with the present invention, but are not intended to be defining of the full scope of the present invention.

Certain aspects of the present invention are directed to a fuel dispenser comprising fuel flow piping defining a flow path from a source of fuel toward a fueling nozzle. A plurality of fuel handling components are disposed along the fuel flow piping. Control electronics, in operative communication with the fluid handling components, include a multi-core processor having at least two processor cores located on a common integrated circuit chip, the at least two processor cores utilizing different operating systems in an asynchronous manner. For example, a first processor core of the at least two processor cores may utilize a real-time operating system and a second processor core of the at least two processor cores may utilize a non-real time operating system.

The plurality of fuel handling components may comprise at least one electrically-controlled valve, with the first processor core being operative to control operation of the valve. The first processor core may execute pump hydraulic software to calculate a running total of volume and price of fuel dispensed during a dispensing event. The pump hydraulic software may preferably be identified by digital fingerprint before executing via the real-time operating system.

The fuel dispenser may include a user interface having at least one peripheral device for input of sensitive payment information, the second processor core controlling operation of the at least one peripheral device. The at least one peripheral device may comprise a card reader and/or a PIN pad.

Embodiments are contemplated in which the multi-core processor has at least four processor cores utilizing at least three different types of operating systems (e.g., including at least one real time operating system and at least one non-real time operating system), all operating in an asynchronous manner. For example, at least two different types of non-real time operating systems may be utilized (e.g., one of which may be the Linux operating system).

In an example embodiment, the fuel dispenser has a user interface comprising a media display, one of the cores functioning as a media processor to drive content (e.g., advertising information) to the media display.

In a preferred embodiment, the common integrated circuit chip further includes an on-board memory shared by all of the processor cores. Software running on the processor cores may communicate with each other via the on-board memory.

Another aspect of the present invention provides a fuel dispenser comprising fuel flow piping defining a flow path from a source of fuel toward a fueling nozzle. A plurality of fuel handling components are disposed along the fuel flow piping, the fuel handling components including at least one electrically-controlled valve. A user interface having at least one peripheral device for input of sensitive payment information and a media display are also provided. Control electronics are in operative communication with the fluid handling components, the control electronics including a multi-core processor having at least three processor cores located on a common integrated circuit chip which operate separately in an asynchronous manner. In this regard, a first processor core of the at least three processor cores utilizes a real-time operating system to control hydraulic functions of the fuel dispenser. A second processor core of the at least three processor cores utilizes a first non-real time operating system to control payment functions of the fuel processor. A third processor core of the at least three processor cores utilizes a second non-real time operating system and functions as a media processor to drive content to the media display. In a preferred embodiment, the multi-core processor has at least four processor cores utilizing at least three different types of operating systems, all operating in an asynchronous manner.

Different systems and methods of the present invention utilize various combinations of the disclosed elements and method steps as supported by the overall disclosure herein. Thus, combinations of elements other than those discussed above may be claimed. Moreover, the accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Some embodiments of the present invention may be particularly suitable for use with a fuel dispenser in a retail service station environment, and the below discussion will describe some preferred embodiments in that context. However, those of skill in the art will understand that the present invention is not so limited. In fact, it is contemplated that embodiments of the present invention may be used with any fluid dispensing environment and with other fluid dispensers. For example, embodiments of the present invention may also be used with diesel exhaust fluid (DEF) dispensers, compressed natural gas (CNG) dispensers, and liquefied petroleum gas (LPG) and liquid natural gas (LNG) applications, among others.

Examples of retail fueling environments, fuel dispensers, and user interfaces for fuel dispensers are provided in U.S. Pat. No. 6,435,204 (entitled "Fuel Dispensing System"), U.S. Pat. No. 5,956,259 (entitled "Intelligent Fueling"), U.S. Pat. No. 5,734,851 (entitled "Multimedia Video/Graphics in Fuel Dispensers"), U.S. Pat. No. 6,052,629 (entitled "Internet Capable Browser Dispenser Architecture"), U.S. Pat. No. 5,689,071 (entitled "Wide Range, High Accuracy Flow Meter"), U.S. Pat. No. 6,935,191 (entitled "Fuel Dispenser Fuel Flow Meter Device, System and Method"), U.S. Pat. No. 7,289,877 (entitled "Fuel Dispensing System for Cash Customers"), and U.S. published patent application nos. 20090048710 (entitled "Fuel Dispenser"), 20110185319 (entitled "Virtual PIN Pad for Fuel Payment Systems"), and 20130103190 (entitled "Fuel Dispenser User Interface System Architecture"). The entire disclosure of each of the foregoing patents and applications is hereby incorporated by reference as if set forth verbatim herein for all purposes.

Figure 1:
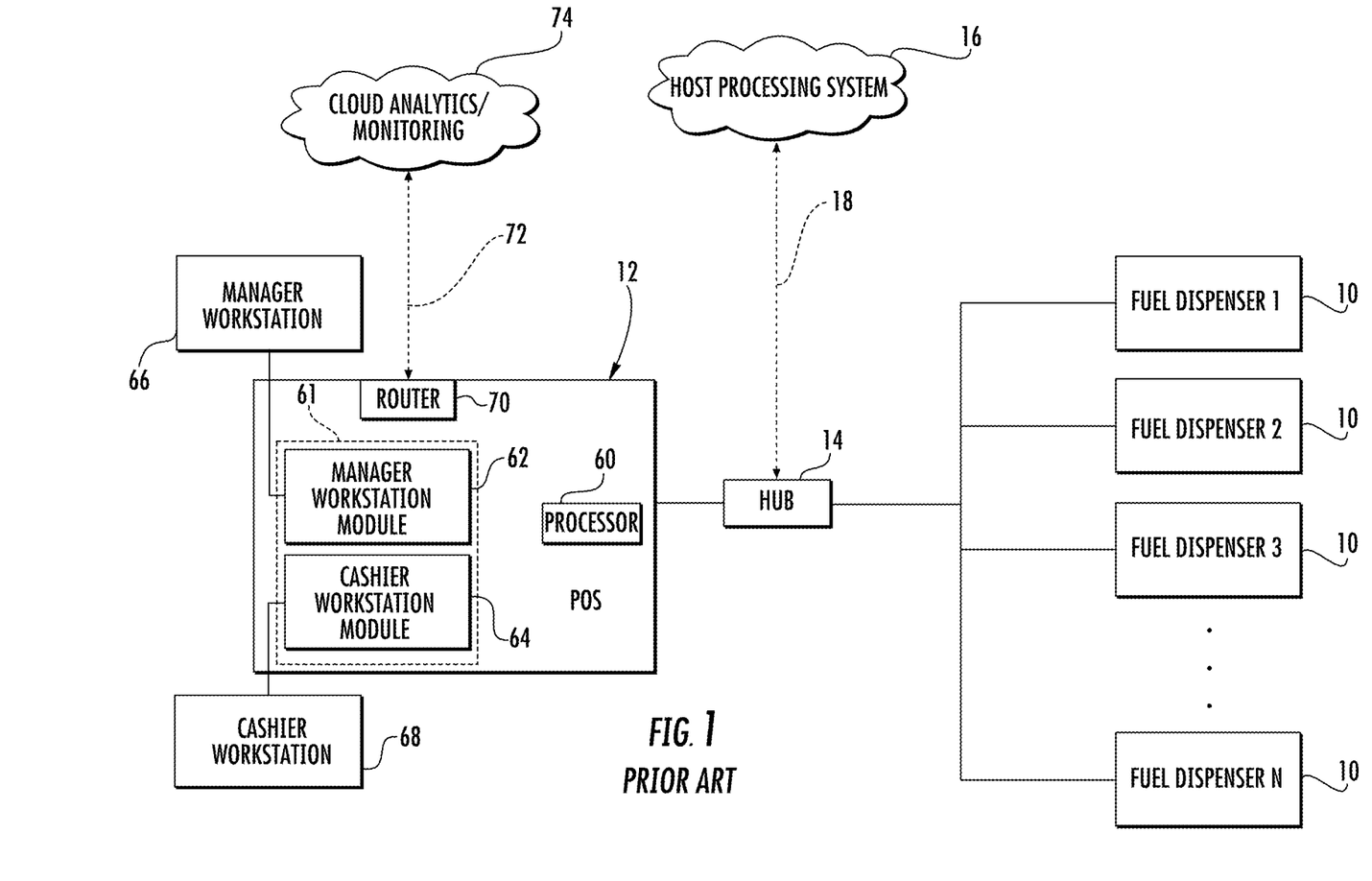
FIG. 1 is a diagrammatic representation of a retail fueling environment of the prior art.

FIG. 1 illustrates an exemplary retail fueling environment of the prior art which may be modified in accordance with aspects of the present invention. One or more fuel dispensers 10 are located in the forecourt region of the retail fueling environment. The fuel dispensers are operative to dispense fuel supplied from one or more underground storage tanks (USTs) into a customer's vehicle. Typically, the fuel dispensers will be provided with "pay-at-the-pump" capability, allowing the customer to authorize and pay for the fueling transaction at the dispenser itself. The retail fueling environment also includes a point-of-sale (POS) system 12 that handles in-store sales activities, as well as various inventory and configuration functions.

The retail fueling environment of FIG. 1 utilizes an enhanced dispenser hub (EDH) 14 as shown and described in U.S. Pat. No. 8,438,064. EDH 14 includes an electronic payment server that allows processing of payment card information. In particular, credit (or debit) card information from the fuel dispensers 10 and any in-store card readers is fed to EDH 14, which seeks approval from a remote host processing system 16 via a suitable off-site communication link 18.

Figure 2:
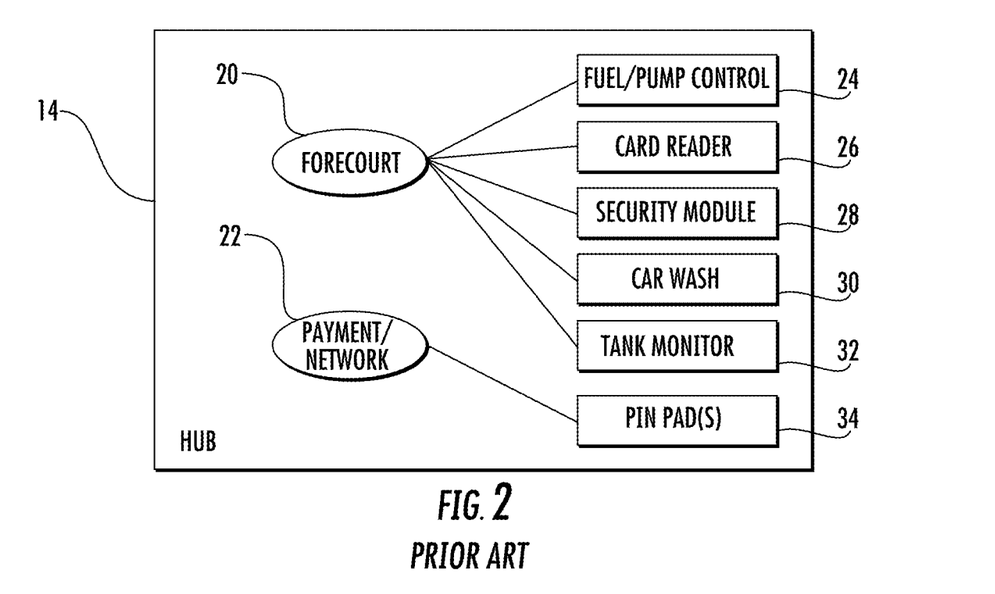
FIG. 2 is a diagrammatic representation showing additional details of the enhanced dispenser hub of FIG. 1.

Referring now to FIG. 2, EDH 14 includes one or more processors and associated memory running a forecourt module 20 and a payment module 22. Forecourt module 20 is adapted to control the operation of devices located in the retail fueling environment's forecourt. In this example, forecourt module 20 comprises several modules, including fuel/pump control module 24, card reader module 26, security module 28, car wash module 30, and tank monitor module 32. The fuel/pump control module 24 handles operation of dispensers 10, while the car wash module 30 handles operation of any on-site car washes. The tank monitor module 32 handles operation of any tank monitors connected to the underground storage tanks of the retail fueling environment. The card reader module 26 handles operation of the card readers of the retail fueling environment, such as the card readers of dispensers 10. The security module 28 handles encryption of the sensitive information transmitted by the components of the retail fueling environment. For instance, payment card data received by the various card readers in the retail fueling environment may be handled by the card reader module 26 and encrypted by the security module 28.

Payment module 22 performs validation of the payment card information received by the various card readers in the retail fueling environment. In particular, payment module 22 handles communications to and from the host processing system 16. As shown, payment module 22 communicates with a PIN pad module 34 when information from a PIN pad is necessary to process the transaction.

Figure 3:
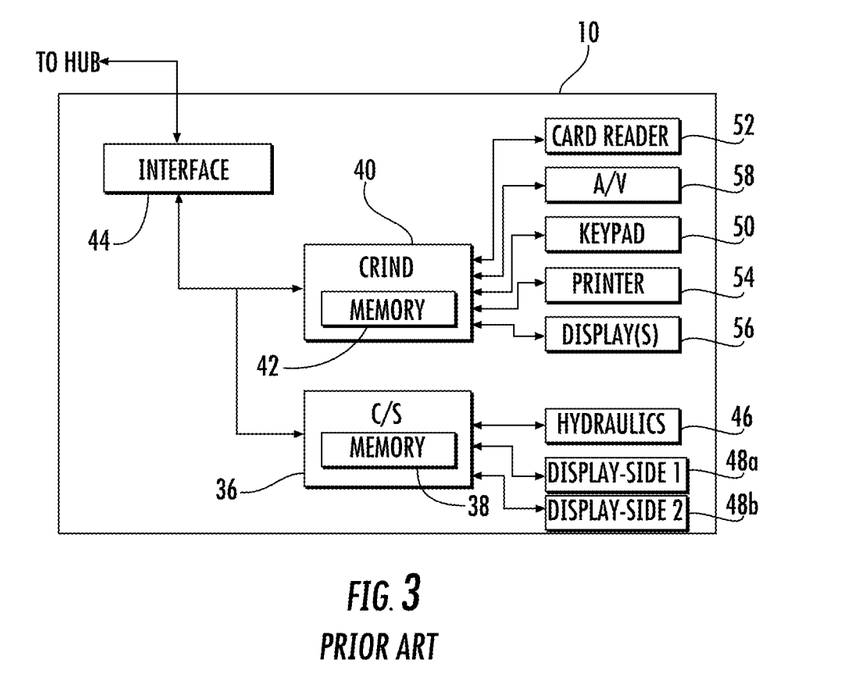
FIG. 3 is a diagrammatic representation showing additional details of a fuel dispenser shown in FIG. 1.

Referring now to FIG. 3, additional details regarding the various components of fuel dispenser 10 can be more easily explained. As shown, fuel dispenser 10 includes a control system 36 having an associated memory 38. In addition, dispenser 10 may also comprise a CRIND (card reader in dispenser) module 40 and associated memory 42. Those of ordinary skill in the art are familiar with CRIND units used in fuel dispensers, but additional background information is provided in U.S. Pat. No. 4,967,366, the entirety of which is incorporated by reference herein for all purposes. As shown, control system 36 and CRIND module 40 are in operative communication with EDH 14 via an interface 44.

Control system 36 includes the hardware and software necessary to control the hydraulic components and functions of dispenser 10. Those of ordinary skill in the art are familiar with the operation of the hydraulics 46 of dispenser 10. In general, however, fuel from USTs is pumped through a piping network into an inlet pipe. Fuel being dispensed passes though a flow meter, which is responsive to flow rate or volume. A pulser is employed to generate a signal in response to fuel flow though the meter and communicate this information to control system 36. Control system 36 may also provide control signaling to a valve that may be opened and closed to permit or not permit dispensing of fuel.

Meter flow measurements from the pulser are collected by control system 36, which utilizes a real-time operating system. Control system 36 also typically performs calculations such as cost associated with a fuel dispensing transaction. As a dispensing transaction progresses, fuel is then delivered to a hose and through a nozzle into the customer's vehicle. Dispenser 10 includes a nozzle boot (i.e., a cradle for the nozzle), which may be used to hold and retain the nozzle when not in use. The nozzle boot may include a mechanical or electronic switch in communication with control system 36 to indicate when the nozzle has been removed for a fuel dispensing request and when the nozzle has been replaced, signifying the end of a fueling event. Control system 36 may thus determine whether a transaction has been initiated or completed.

Control system 36 may further be operative to control one or more displays, such as displays 48a and 48b provided on respective sides of fuel dispenser 10. For example, a transaction price total display may present customers with the price for fuel that is dispensed. A transaction gallon total display may be used to present customers with the measurement of fuel dispensed in units of gallons or liters. Finally, price per unit (PPU) displays may be provided to show the price per unit of fuel dispensed in either gallons or liters, depending on the programming of dispenser 10.

CRIND module 40 includes the hardware and software necessary to support payment processing and peripheral interfaces at dispenser 10. In this regard, CRIND module 40 may be in operative communication with several input devices. For example, a PIN pad 50 is typically used for entry of a PIN if the customer is using a debit card for payment of fuel or other goods or services. CRIND module 40 may also be in operative communication with a card reader 52 for accepting credit, debit, or other magnetic stripe cards for payment. Additionally, card reader 52 may accept loyalty or program-specific cards as is well known. Further, CRIND module 40 may be in operative communication with other payment or transactional devices such as a receipt printer 54.

One or more display(s) 56 may be used to display information, such as transaction-related prompts and advertising, to the customer. Again, two such displays would typically be provided on a two-sided dispenser. The customer may use soft keys to respond to information requests presented to the user via a display 56. In some embodiments, however, a touch screen may be used for a display 56. In this case, display 56 may be configured to display a virtual keypad for receiving payment data such as a PIN of a debit card or the billing postal (zip) code of a credit card, for instance. A display 56 may also be used to receive a selection from the customer regarding the displayed information.

Audio/video electronics 58 are adapted to interface with the CRIND module 40 and/or an auxiliary audio/video source to provide advertising, merchandising, and multimedia presentations to a customer in addition to basic transaction functions. The graphical user interface provided by the dispenser may allow customers to purchase goods and services other than fuel at the dispenser. For example, the customer may purchase a car wash and/or order food from the store while fueling a vehicle.

Referring again to FIG. 1, POS 12 includes a server having a processor 60 and associated memory 61. In the present example, processor 60 executes several software modules including manager workstation module 62 and cashier workstation module 64. When executed, manager workstation module 62 displays a GUI on manager workstation 66 that allows the owner, operator, or manager of the fueling station to set options for the fueling environment. Manager workstation module 66 is also adapted to provide point-of-sale ("POS") capabilities, including the ability to conduct transactions for items offered for sale by the fueling station. Toward this end, manager workstation 66 includes a suitable display, such as a touchscreen display. As one skilled in art will appreciate, the server may be incorporated into the hardware of manager workstation 66.

Similarly, cashier workstation module 64 provides the station's cashier, clerk, or employee the means necessary to effect a transaction for one or more items or services offered by the fueling station. Cashier workstation module 64 communicates with the hardware of cashier workstation 68, which includes its own display.

A suitable router 70 may be associated with POS 12 for internet communication. Fuel dispensers 10 and POS 12 may thus have access to various resources (via internet link 72) that may be provided remotely from the cloud 74.

In operation, a user positions a vehicle adjacent to one of dispensers 10 and uses the dispenser to refuel the vehicle. For payment, the user inserts and removes a payment card from card reader 52. Card reader 52 reads the information on the payment card and transmits the information to forecourt module 20 via card reader module 26. The forecourt module 20 provides the payment information to network payment module 22, which contacts host processing system 16 operated by the financial institution associated with the user's payment card. The financial institution either validates or denies the transaction and transmits such a response to network payment module 22. The information received from the financial institution's host computer system is transmitted from network payment module 22 back to forecourt module 20 to handle appropriately. This may include transmitting to dispenser 10 a request that the user provide another payment card if the transaction is denied or printing a receipt if authorized.

Figure 4:
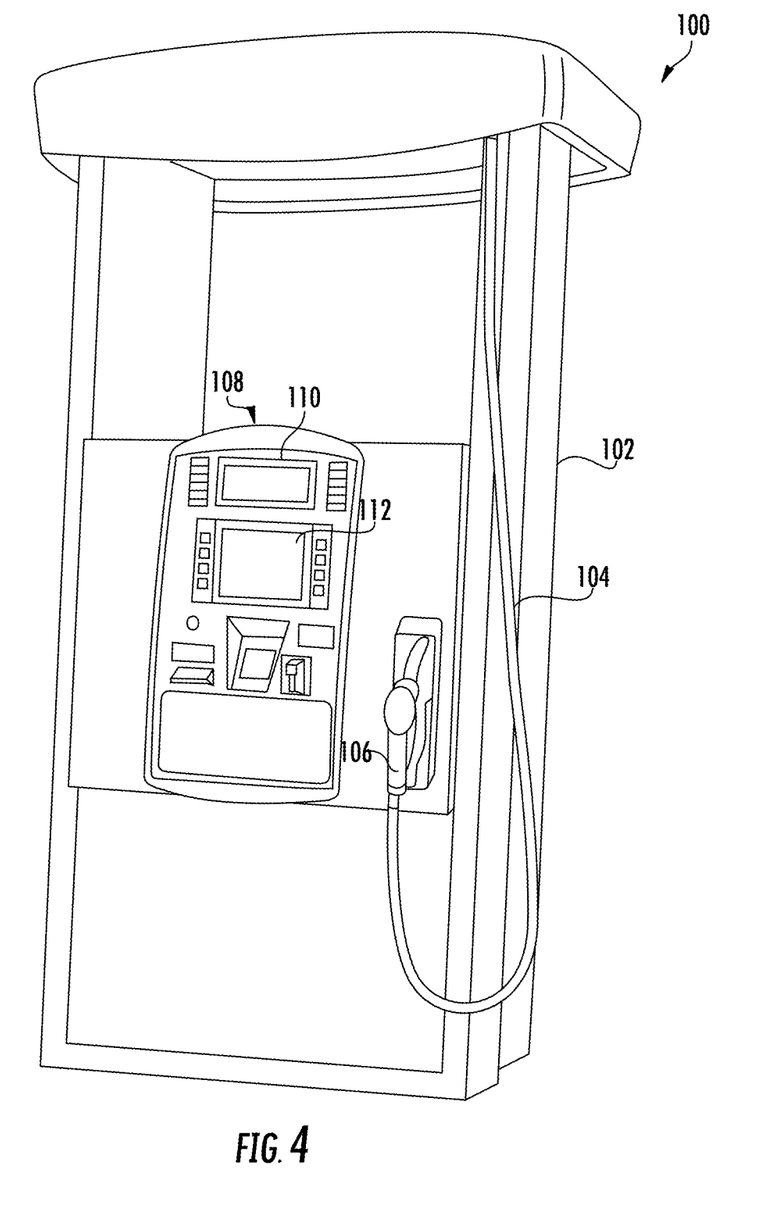
FIG. 4 is a perspective view of an exemplary fuel dispenser in accordance with an embodiment of the present invention.
Figure 5:
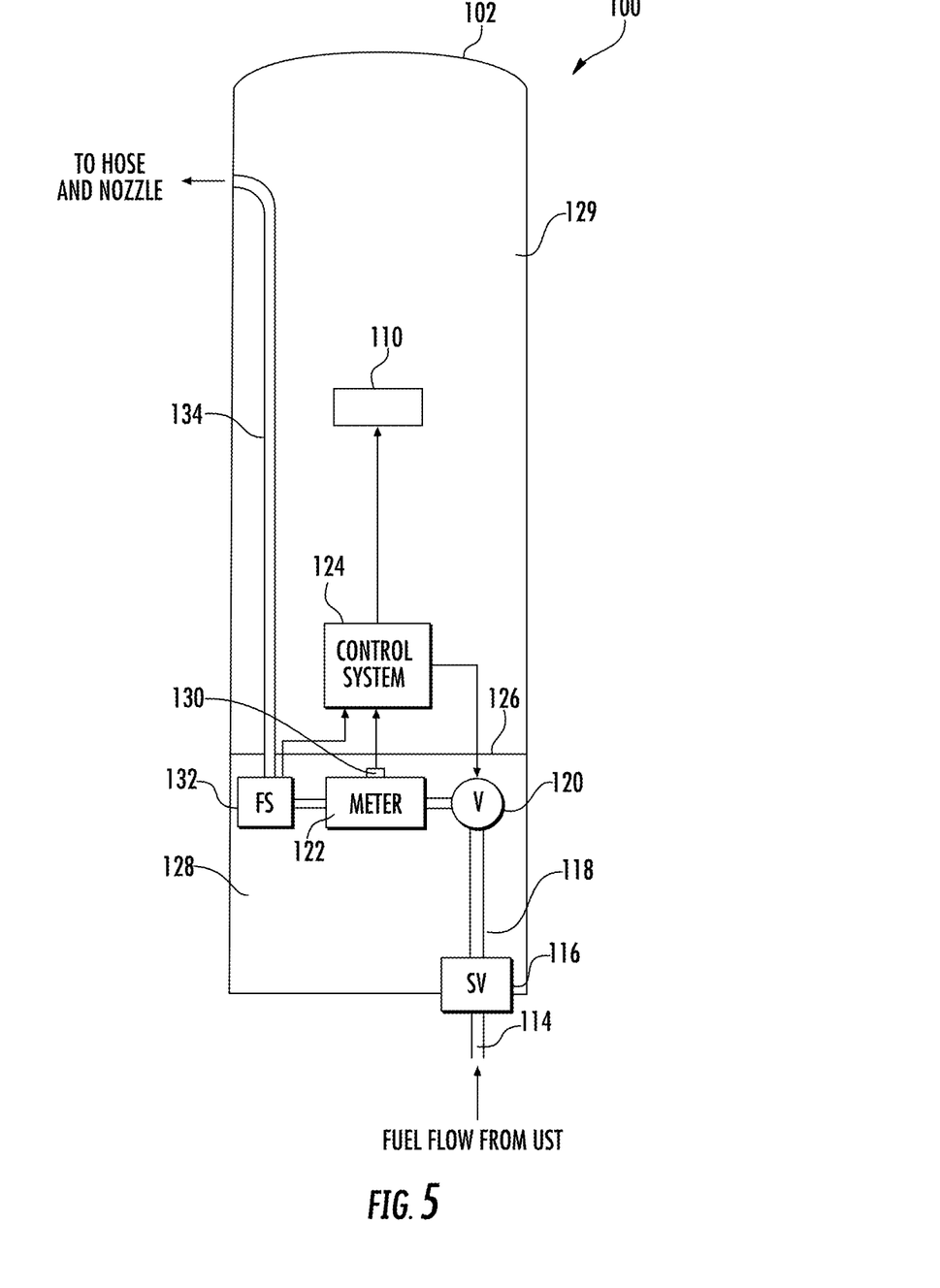
FIG. 5 is a diagrammatic representation of internal components of the fuel dispenser of FIG. 4 according to an embodiment of the present invention.

Referring now to FIGS. 4 and 5, a fuel dispenser 100 in accordance with an aspect of the present invention will be described. One skilled in the art will recognize that many of aspects of fuel dispenser 100 are conventional, and similar to aspects described above in relation to the prior art. However, fuel dispenser 100 utilizes improved control electronics that integrate many disparate functions onto a single semiconductor chip for efficiency and cost reduction.

As shown in FIG. 4, fuel dispenser 100 includes a housing 102 with a flexible fuel hose 104 extending therefrom. Fuel hose 104 terminates in a manually-operated nozzle 106 adapted to be inserted into a fill neck of a vehicle's fuel tank. Nozzle 106 includes a fuel valve (typically a manual valve). Various fuel handling components, such as valves and meters, are also located inside of housing 102. These fuel handling components allow fuel to be received from underground piping and delivered through hose 104 and nozzle 106 to a vehicle's tank, as is well understood.

Fuel dispenser 100 has a customer interface 108. Customer interface 108 may include an information display 110 relating to an ongoing fueling transaction that includes the amount of fuel dispensed and the price of the dispensed fuel. Further, customer interface 108 may include a display 112 that provides instructions to the customer regarding the fueling transaction. Display 112 may also provide advertising, merchandising, and multimedia presentations to a customer, and may allow the customer to purchase goods and services other than fuel at the dispenser.

FIG. 5 is a schematic illustration of internal fuel flow components of fuel dispenser 100 according to an embodiment of the present invention. In general, fuel may travel from an underground storage tank (UST) via main fuel piping 114, which may be a double-walled pipe having secondary containment as is well known, to fuel dispenser 100 and nozzle 106 for delivery. More specifically, a submersible turbine pump (STP) associated with the UST is used to pump fuel to the fuel dispenser 100. However, some fuel dispensers may be self-contained, meaning fuel is drawn to the fuel dispenser 100 by a pump unit positioned within housing 102.

Main fuel piping 114 passes into housing 102 through a shear valve 116. As is well known, shear valve 116 is designed to close the fuel flow path in the event of an impact to fuel dispenser 100. Shear valve 116 contains an internal fuel flow path to carry fuel from main fuel piping 114 to internal fuel piping 118.

After fuel exits the outlet of shear valve 116 and enters into internal fuel piping 118, it flows toward a flow control valve 120 positioned upstream of a flow meter 122. Alternatively, valve 120 may be positioned downstream of the flow meter 122. In one embodiment, valve 120 may be a proportional solenoid controlled valve, such as described in U.S. Pat. No. 5,954,080, hereby incorporated by reference in its entirety for all purposes.

Flow control valve 122 is under control of a control system 124. Control system 124 typically controls aspects of fuel dispenser 100, such as valves, displays, and the like. For example, control system 124 instructs flow control valve 120 to open (e.g., how much to open) when a fueling transaction is authorized. In addition, control system 124 may be in electronic communication with a POS (or EDH) located at the fueling site. The POS communicates with control system 124 to control authorization of fueling transactions and other conventional activities.

A vapor barrier 126 delimits hydraulics compartment 128 of fuel dispenser 100, and control system 124 is located in electronics compartment 129 above vapor barrier 126. Fluid handling components, such as flow meter 122, are located in hydraulics compartment 128. In this regard, flow meter 122 may be any suitable flow meter known to those of skill in the art, including positive displacement, inferential, and Coriolis mass flow meters, among others. Meter 122 typically comprises electronics 130 that communicates information representative of the flow rate or volume to control system 124. For example, electronics 130 may include a pulser or other suitable displacement sensor as known to those skilled in the art. In this manner, control system 124 can update the total gallons (or liters) dispensed and the price of the fuel dispensed on information display 110.

As fuel leaves flow meter 122 it enters a flow switch 132, which preferably comprises a one-way check valve that prevents rearward flow through fuel dispenser 100. Flow switch 132 provides a flow switch communication signal to control system 124 when fuel is flowing through flow meter 122. The flow switch communication signal indicates to control system 124 that fuel is actually flowing in the fuel delivery path and that subsequent signals from flow meter 122 are due to actual fuel flow. Fuel from flow switch 132 exits through internal fuel piping 134 to fuel hose 104 and nozzle 106 for delivery to the customer's vehicle.

A blend manifold may also be provided downstream of flow switch 132. The blend manifold receives fuels of varying octane levels from the various USTs and ensures that fuel of the octane level selected by the customer is delivered. In addition, fuel dispenser 100 may in some embodiments comprise a vapor recovery system to recover fuel vapors through nozzle 106 and hose 104 to return to the UST. An example of a vapor recovery assist equipped fuel dispenser is disclosed in U.S. Pat. No. 5,040,577, incorporated by reference herein in its entirety for all purposes.

Additional details of control electronics 124 will now be described with reference to FIGS. 6-8. As shown, control electronics 124 utilizes a multi-core CPU chip 136 (at least two cores) which integrates on a single chip several disparate functions otherwise provided by separate microprocessors. The separate cores of CPU chip 136 are operated asynchronously using at least two different operating systems. For example, one core may be used to control independently the dispenser's hydraulics in real-time, while one or more other cores can run media as an application, handle cloud connectivity, or perform the functions of EDH 14. Moreover, metrological applications, such as the pump hydraulics software, are strictly controlled by Weights and Measures (W/M) authorities. In this case, the software's digital fingerprint can be taken, and then locked down. By assigning hydraulic control to a dedicated core, other functions can be performed using the remaining cores without having to revisit and recertify W/M each time a new feature or feature mix is offered.

Figure 6:
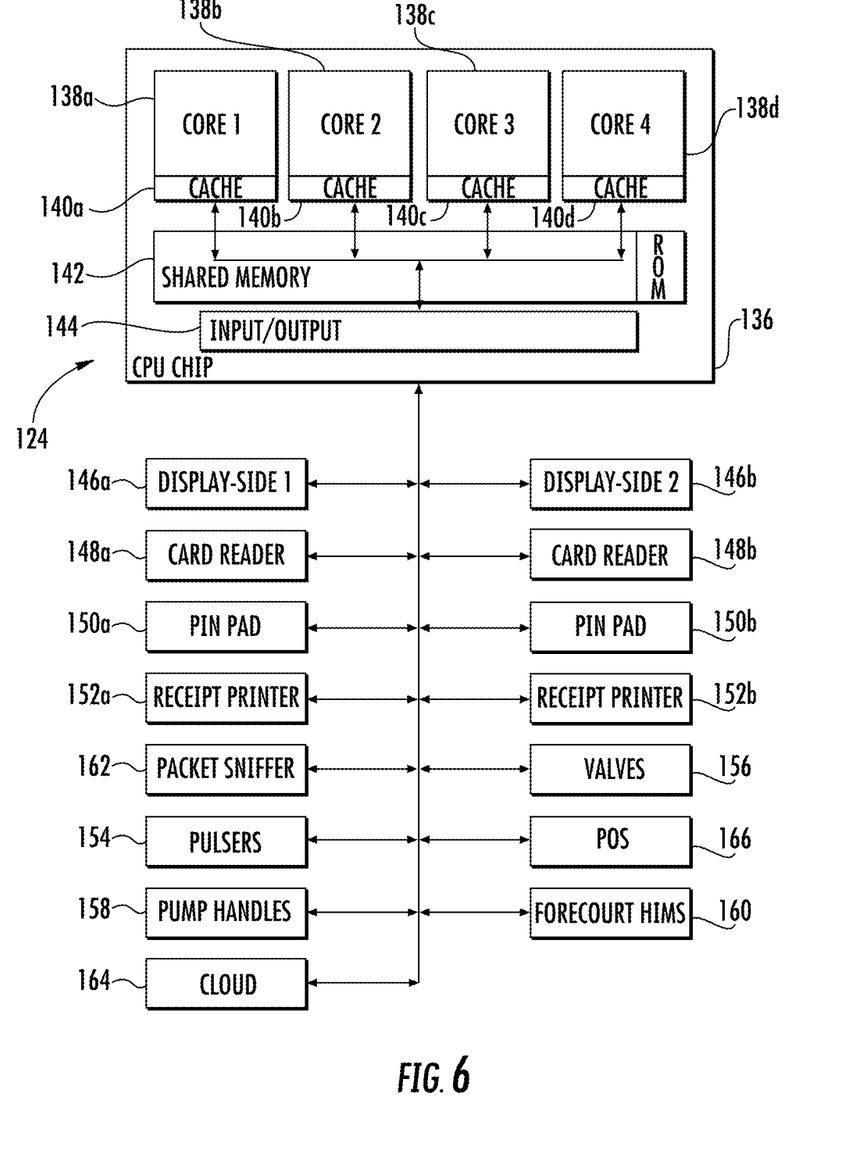
FIG. 6 is a diagrammatic representation of integrated fuel dispenser control electronics in accordance with an embodiment of the present invention and various peripherals.

As shown in FIG. 6, for example, CPU chip 136 in this case has a total of four cores 138a-d on the same semiconductor die. Typically, each such core will have an associated cache memory 140a-d. In addition, a shared memory 142 having both RAM and ROM components also resides on chip 136. Any of the four cores 138a-d can communicate with any other of the four cores 138a-d, as necessary or desirable, via memory 142. Chip 136 further includes suitable input/output (I/O) 144 to allow communication between the cores 138a-d and off-chip components.

In the illustrated embodiment, for example, chip 136 communicates with components located on the respective sides of fuel dispenser 100, such as displays 146*a-b* (which may include both price/volume and advertising/media displays), card readers 148*a-b*, PIN pads 150*a-b*, and receipt printers 152*a-b*. Chip 136 may receive flow or volume information from one or more pulsers 154, and may control flow valves 156. A switch or other suitable mechanism 158 indicates that a pump handle 158 has been removed from or returned to its boot. Forecourt Hardware Interface Modules (HIMS) 160 in this embodiment provide a service physical layer interface PCB between pump and payment kiosk (typically a separate box serving as protocol translator between pump and payment kiosk).

In some preferred embodiments, fuel dispenser 100 may be equipped with a packet sniffer 162 to detect and potentially modify incoming and outgoing legacy signals. An example of such a sniffer is shown and described in U.S. Pub. No. 2015/0105920, incorporated herein by reference in its entirety for all purposes. The sniffer may operate via software running on one of cores 138*a-b*. Communications with the cloud 164 and POS 166 may also be accomplished using software running on one of cores 138*a-d*.

Figure 7:
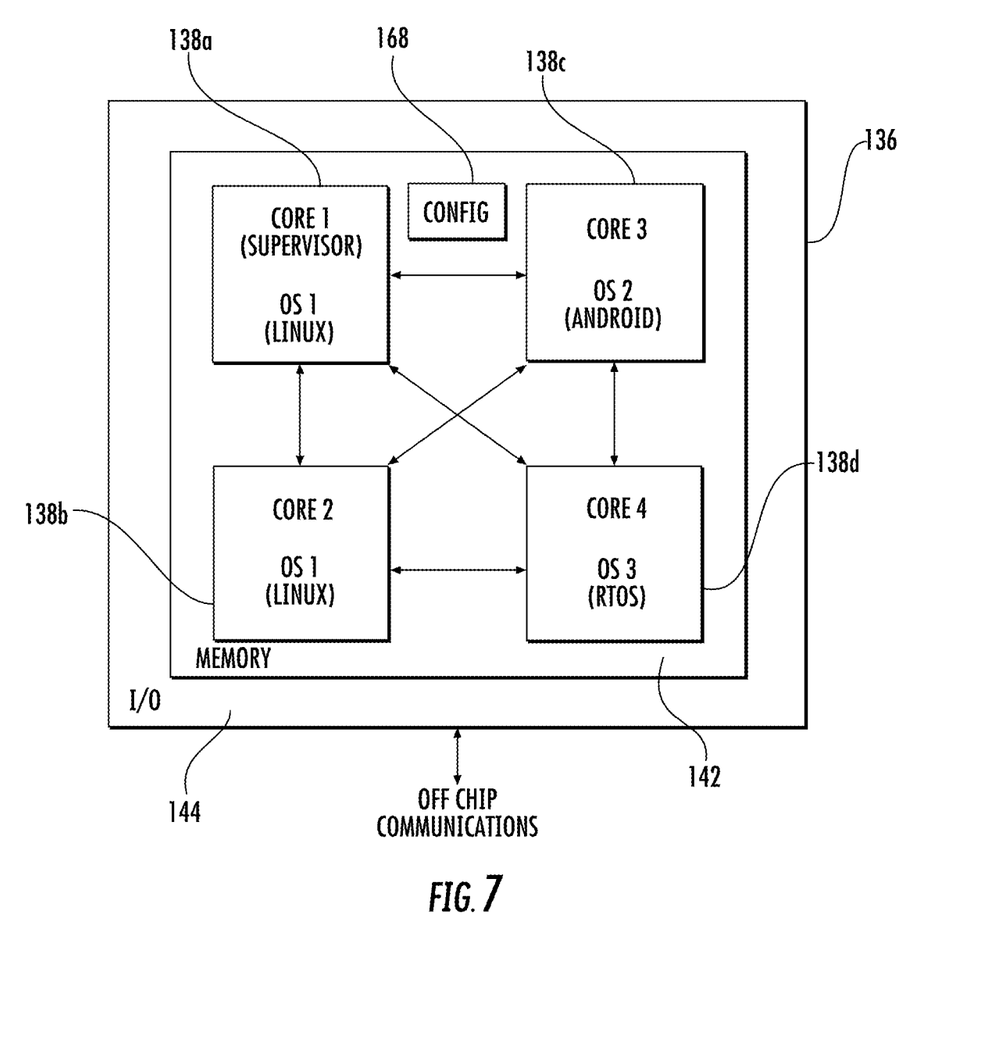
FIG. 7 is a diagrammatic representation of the control electronics of FIG. 6 showing certain additional details.

FIG. 7 illustrates chip 136 another way so that certain aspects can be better explained. As can be seen, core 138*a* ("Core 1") is designated by the configuration file 168 as the "supervisor" which initiates operation of the other cores. Configuration file 168 also defines how the various peripheral components may be assigned to the respective cores. As shown, core 138*a*, along with core 138*b* ("Core 2"), utilize separate instances of a first operating system ("OS1"), such as the Linux operating system. Thus, cores 138*a-b* may run Linux-environment processes. Core 138*c* ("Core 3"), in this example has a second operating system ("OS2"), such as the Android operating system. As a result, it is available for various Android applications as desired, for example, by the operator of the fueling environment. In this regard, attention is drawn to U.S. Pub. No. 20140089174, incorporated herein by reference for all purposes. Core 138*d* ("Core 4") operates a third operating system ("OS2"), in this case a real-time operating system (RTOS). Core 138*d* thus handles the dispenser's hydraulic functions.

Figure 8:
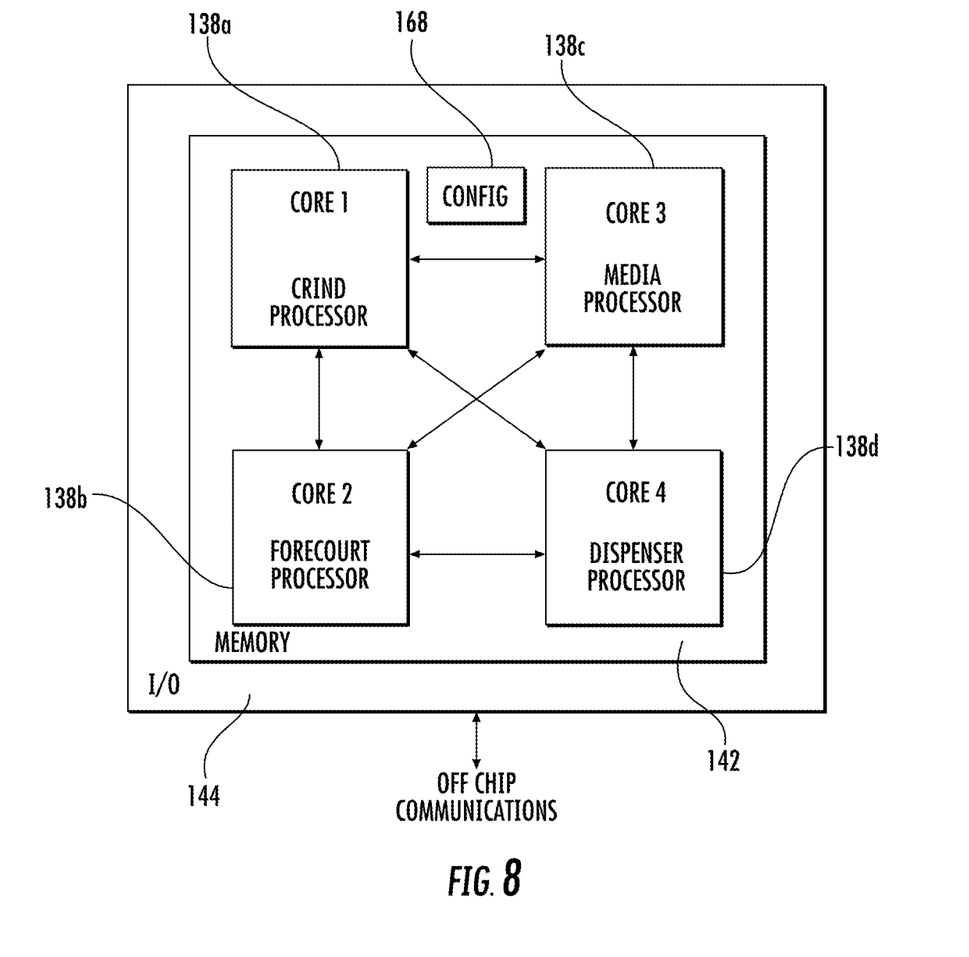
FIG. 8 is a diagrammatic representation of the control electronics of FIG. 6 showing certain additional details.

FIG. 8 provides specific examples of different functions that may be assigned to cores 138*a-d* in accordance with the present invention. As shown, the CRIND is implemented in core 138*a*, whereas forecourt control is implemented in core 138*b*. A media processor can reside on core 138*c* for showing high-definition multimedia presentations on the displays of fuel dispenser 100. The dispenser processor (hydraulic control) is implemented in 138*d* as described above. In practice, one core may support multiple applications (and others left reserved); the only limitations being common operating system for those applications sharing a given core, and up to four unique operating systems permissible in the case of a quad-core CPU.

In this example, communications between applications occurs through shared memory. Alternatively, each application may communicate by IP address, as if separate physical devices, even though physically common.

In a preferred embodiment CPU chip 136 may be the i.MX6 quad-core processor available from NXP Semiconductor. In addition to the four cores, this chip has ancillary processing units, such as for video rendering and encryption, that can be used as necessary or desired during operation of the respective cores.

Moreover, while some embodiments may utilize a RTOS running in one core for real-time (more precisely, timing-precise) elements, and Linux or the like for supervisory and other functions, embodiments are contemplated in which all real-time (timing-precise) elements are migrated off CPU chip 136, and multiple, but now similar operating systems, such as Linux, run asynchronously-separately-independently on the respective cores.

For example, the i.MX6 chip is an "A" (Applications class only, e.g. A5, A9, etc.) that lacks by market segment nature "M" (Microcontroller class, e.g. M4) machine-interface elements commonly expected within a M4, such as A/D conversion, D/A conversion, etc. To deal with this absence of machine-interface elements within an A-class part, the i.MX6 chip may need to be used in conjunction with a separate PIC microcontroller to handle A/D; and furthermore in this case, also valve PWM and general purpose I/O such as STP/motor control.

Specifically, one could continue to extend this offloading of tasks associated with an M-class device until all real-time requirements are effectively fully offloaded, such as proportional valve modulation (including constant-current loop), timely pulser data capture, and time-constrained/as-dictated metrological. Nevertheless, remaining however would be an appreciable amount of pump controller elements, albeit those non-real-time, but far in excess for what could be processed within a PIC-class device.

Moreover, moving non-time critical elements to Linux (or a similar operating system) may be highly desirable; hence the use of such operating systems but which are asynchronous-independent. Importantly, any metrological elements that require regulatory certifications/approvals and sealing (i.e. digital signature) can still be "sandboxed" on one core, and the remaining core(s) left free.

While one or more preferred embodiments of the invention have been described above, it should be understood that any and all equivalent realizations of the present invention are included within the scope and spirit thereof. Thus, the embodiments depicted are presented by way of example only and are not intended as limitations upon the present invention as modifications can be made. Therefore, it is contemplated that any and all such embodiments are included in the present invention as may fall within the scope and spirit thereof.

What is claimed is:

1. A fuel dispenser comprising:
   fuel flow piping defining a flow path from a source of fuel toward a fueling nozzle;
   a plurality of fuel handling components disposed along said fuel flow piping, said fuel handling components including at least one electrically-controlled valve;
   a user interface having at least one peripheral device for input of sensitive payment information and a media display;
   control electronics in operative communication with said fluid handling components, said control electronics including a multi-core processor having at least three processor cores located on a common integrated circuit chip, said at least three processor cores operating separately in an asynchronous manner;
   a first processor core of said at least three processor cores utilizing a real-time operating system to control hydraulic functions of said fuel dispenser;
   a second processor core of said at least three processor cores utilizing a first non-real time operating system to control payment functions of said fuel processor; and
   a third processor core of said at least three processor cores utilizing a second non-real time operating system and functioning as a media processor to drive content to said media display.

2. A fuel dispenser as set forth in claim 1, wherein said first processor core is operative to control operation of said electrically-controlled valve.

3. A fuel dispenser as set forth in claim 1, wherein said first processor core executes pump hydraulic software to calculate a running total of volume and price of fuel dispensed during a dispensing event.

4. A fuel dispenser as set forth in claim 1, wherein said pump hydraulic software is identified by digital fingerprint before executing via said real-time operating system.

5. A fuel dispenser as set forth in claim 1, wherein said at least one peripheral device comprises at least one of a card reader and a PIN pad.

6. A fuel dispenser as set forth in claim 1, wherein said multi-core processor has at least four of said processor cores utilizing at least three different types of operating systems, all operating in an asynchronous manner.

7. A fuel dispenser as set forth in claim 1, wherein said first non-real time operating system and said second non-real time operating system are different operating systems.

8. A fuel dispenser as set forth in claim 1, wherein said first non-real time operating system and said second non-real time operating system are different instances of the same type operating system.

9. A fuel dispenser as set forth in claim 1, wherein at least one of said first non-real time operating system and said second non-real time operating system is the Linux operating system.

10. A fuel dispenser as set forth in claim 1, wherein said content includes advertising information.

11. A fuel dispenser as set forth in claim 1, wherein said common integrated circuit chip further includes an on-board memory shared by all of said processor cores.

12. A fuel dispenser as set forth in claim 11, wherein software running on said processor cores communicates with each other via said on-board memory.

* * * * *